(12) United States Patent
Panda

(10) Patent No.: US 8,396,297 B2
(45) Date of Patent: Mar. 12, 2013

(54) SUPERVISED EDGE DETECTION USING FRACTAL SIGNATURES

(75) Inventor: Subhankar Panda, Penang (MY)

(73) Assignee: Intel Corporation, Santa Clara, CA (US)

( * ) Notice: Subject to any disclaimer, the term of this patent is extended or adjusted under 35 U.S.C. 154(b) by 1324 days.

(21) Appl. No.: 12/127,069

(22) Filed: May 27, 2008

(65) Prior Publication Data
US 2009/0297055 A1    Dec. 3, 2009

(51) Int. Cl.
*G06K 9/48* (2006.01)
(52) U.S. Cl. ......................... 382/199; 382/266
(58) Field of Classification Search ................... 382/199, 382/266
See application file for complete search history.

(56) References Cited

U.S. PATENT DOCUMENTS

| | | | |
|---|---|---|---|
| 2002/0054694 A1* | 5/2002 | Vachtsevanos et al. | 382/111 |
| 2008/0037828 A1* | 2/2008 | Fujita | 382/104 |

OTHER PUBLICATIONS

Xiaodong Zhuang; Qingchun Meng; , "Multi-feature edge extraction with local fractal features," TENCON 2003. Conference on Convergent Technologies for Asia-Pacific Region , vol. 1, no., pp. 247-251 vol.1, Oct. 15-17, 2003 doi: 10.1109/TENCON.2003.1273324 URL: http://ieeexplore.ieee.org/stamp/stamp.jsp?tp=&arnumber=1273324&isnumber=28487.*
Toennies, K.D.; Schnabel, J.A.; , "Edge detection using the local fractal dimension," Computer-Based Medical Systems, 1994., Proceedings 1994 IEEE Seventh Symposium on , vol., no., pp. 34-39, Jun. 10-12, 1994 doi: 10.1109/CBMS.1994.315982 URL: http://ieeexplore.ieee.org/stamp/stamp.jsp?tp=&arnumber=315982&isnumber=7620.*
Benoit, B. M., "The Fractual Geometry of Nature", *International Business Machines Thomas J. Watson Research Center*, (1977), W.H. Freeman and Company, New York.

* cited by examiner

*Primary Examiner* — Wesley Tucker
(74) *Attorney, Agent, or Firm* — Garrett IP, LLC

(57) ABSTRACT

Methods and systems to identify image pixels as edge pixels using fractal signatures associated with the image pixels. Fractal signatures may include one or more of a variety of fractal dimensions. A fractal dimension of a pixel may be generated from an array of pixels that include the pixel, from x and y coordinates and one or more of luminosity values and color values associated with pixels in the array of pixels. Pixels may be identified as edge pixels when their corresponding fractal signatures are equal to or greater than a fractal signature threshold. The fractal signature threshold may be generated in a supervised fashion.

20 Claims, 5 Drawing Sheets

SUPERVISED EDGE DETECTION USING FRACTAL SIGNATURES

BACKGROUND

1. Technical Field

Methods and systems disclosed herein are directed to identifying edge pixels in images using fractal signatures.

2. Background

Edge detection is a feature detection and extraction process used in image and graphics processing. An edge is a relatively sharp change in an image property, such as luminosity, that may be associated with an event or change in a property of the image, such as a discontinuity in depth, a discontinuity in depth surface orientation, changes in material properties, and variations in scene illumination. For example, grey levels in a digital image tend to be relatively consistent across a homogeneous region associated with an image object, and inconsistent along a boundary or edge between regions associated with different image objects. Inage pixels along such a boundary are referred to as edge pixels.

Conventional methods of edge detection include search-based edge detection and zero-crossing based edge detection. Search-based methods detect edges by first computing a measure of edge strength, usually a first-order derivative expression such as a gradient magnitude, and then searching for local directional maxima of the gradient magnitude using a computed estimate of the local orientation of the edge, usually the gradient direction. Search-based, or first-order derivative methods include a Canny edge detector, a Canny-Deriche detector, a Sobel operator, and a Robert's Cross operator. Zero-crossing based methods of edge detection search for zero crossings in a second-order derivative expression computed from the image, usually the zero-crossings of a Laplacian or of a non-linear differential expression. Zero-crossing or second-order derivative edge detection methods include a Marr-Hildreth operator.

In fractal geometry, a fractal dimension is a statistical quantity indicative of how completely a fractal appears to fill space on various scales. The term "fractal" was coined by Benoît Mandelbrot, who defined a fractal as a rough or fragmented geometric shape that can be subdivided into parts, each of which is, at least approximately, a reduced-size copy of the whole. Fractal dimensions include a Hausdorff dimension, a packing dimension, Rényi dimensions, a box-counting dimension, and a correlation dimension.

A fractal dimension may be a real number, including but not limited to an integer. For example, the fractal dimension of a plane may range from 2.0 to 3.0, where a perfectly smooth plane has a fractal dimension of 2.0, and an irregular plane may have fractal dimension approaching or equal to 3.0. Whereas in Euclidean geometry, geometric shapes are assigned integer dimension values that are independent of the size of the geometric shapes. For example, in Euclidean geometry, the dimension of a point is zero (0), the dimension of a curve is one (1), the dimension of a plane is two (2), and the dimension of a cube is three (3).

BRIEF DESCRIPTION OF THE DRAWINGS/FIGURES

Figure 1:
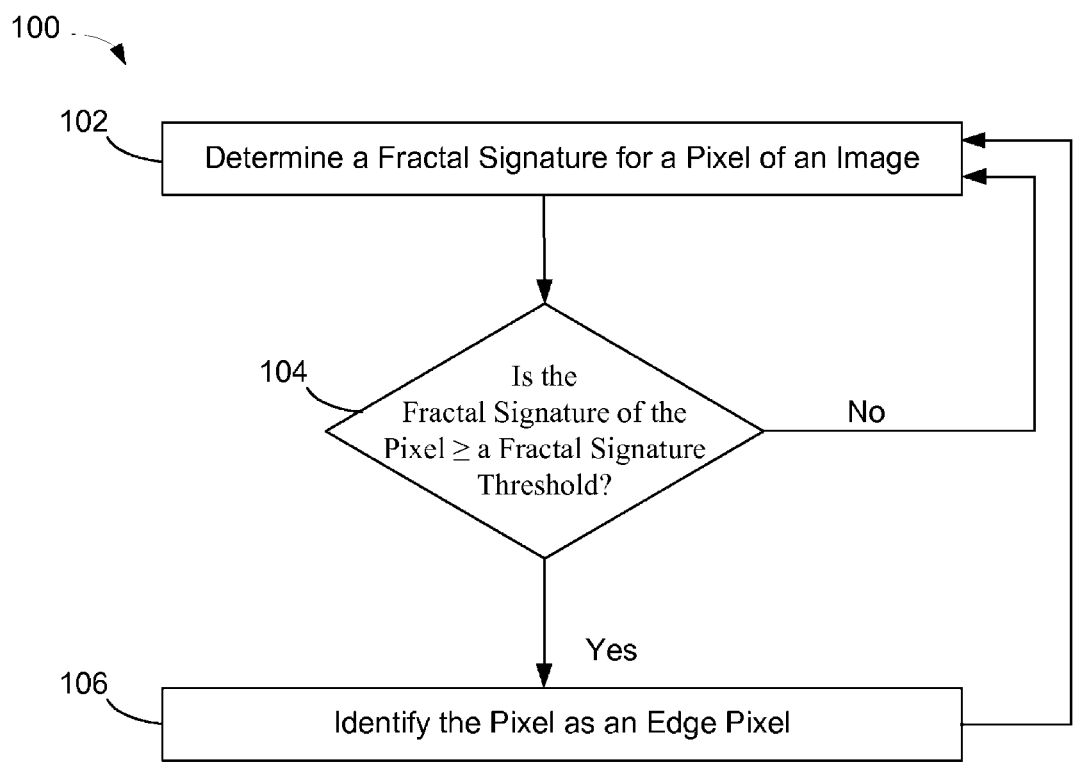
FIG. 1 is a process flowchart illustrating an exemplary method of identifying edge pixels in an image.

In the drawings, the leftmost digit(s) of a reference number identifies the drawing in which the reference number first appears.

DETAILED DESCRIPTION

FIG. 1 is a process flowchart illustrating an exemplary method 100 of identifying edge pixels in an image. Method 100 is described below with reference to FIGS. 2, 3 and 4, for illustrative purposes.

Figure 2:
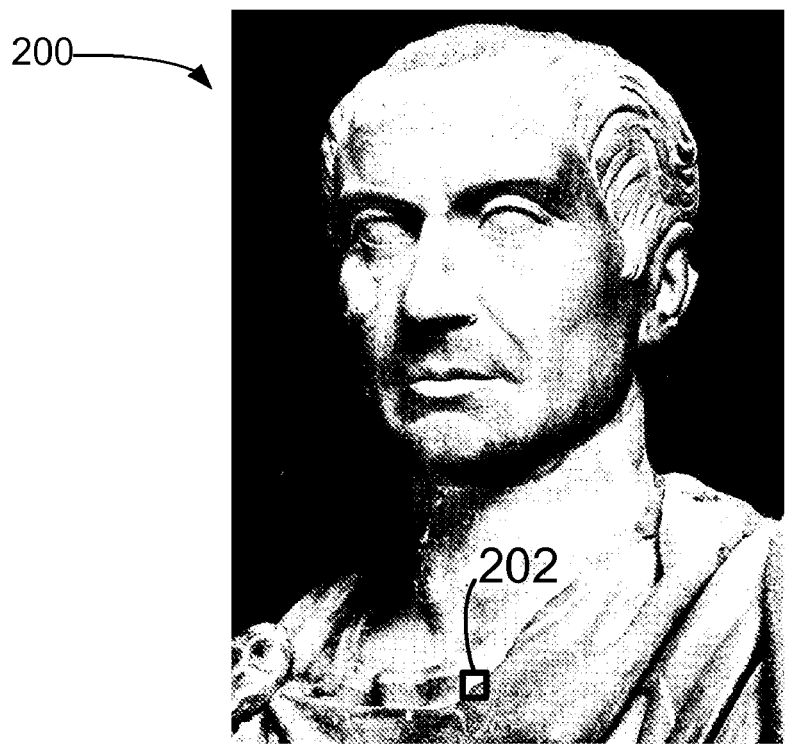
FIG. 2 is an exemplary image that may be represented with image pixels in a computer readable image file.

FIG. 2 is an exemplary image 200 that may be represented with image pixels in a computer readable image file. Image 200 includes a variety of image features that may be distinguished from one another by their corresponding luminosities, or intensities, and/or colors, such as grey scale values. Image pixels that fall on or near boundaries between features are edge pixels.

Figure 3:
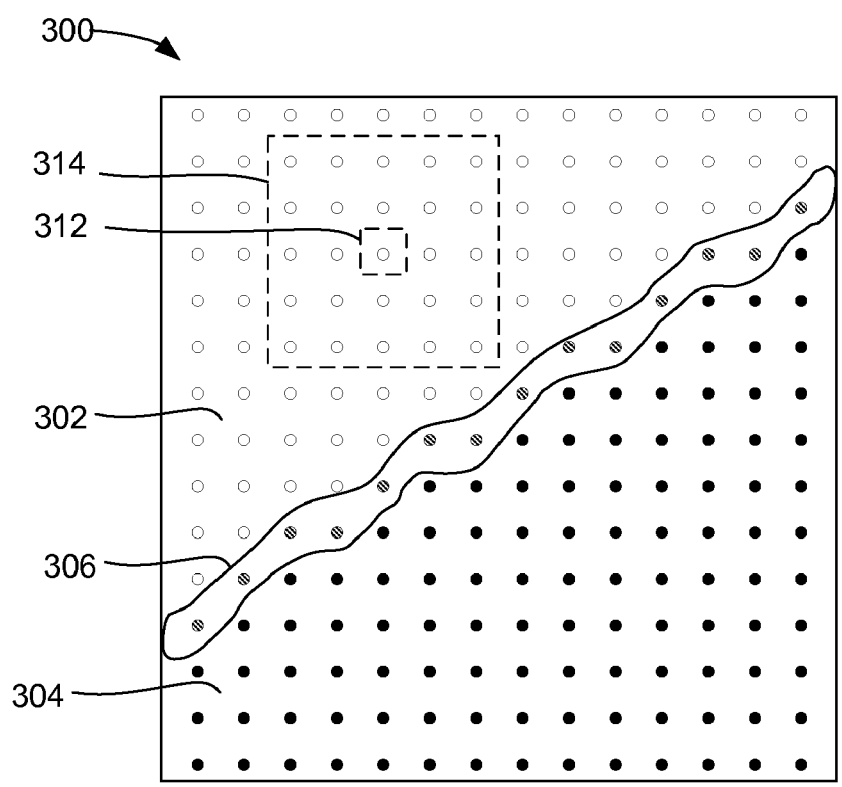
FIG. 3 is a graphical representation of exemplary pixels of an image portion 202 of FIG. 2.

FIG. 3 is a graphical representation of exemplary pixels 300 of an image portion 202 in FIG. 2. Pixels 300 include pixels 302 representative of a relatively light feature, and pixels 304 representative of a relatively darker feature. Pixels that lie along a boundary between pixels 302 and 304, such as pixels 306, may be edge pixels.

Figure 4:
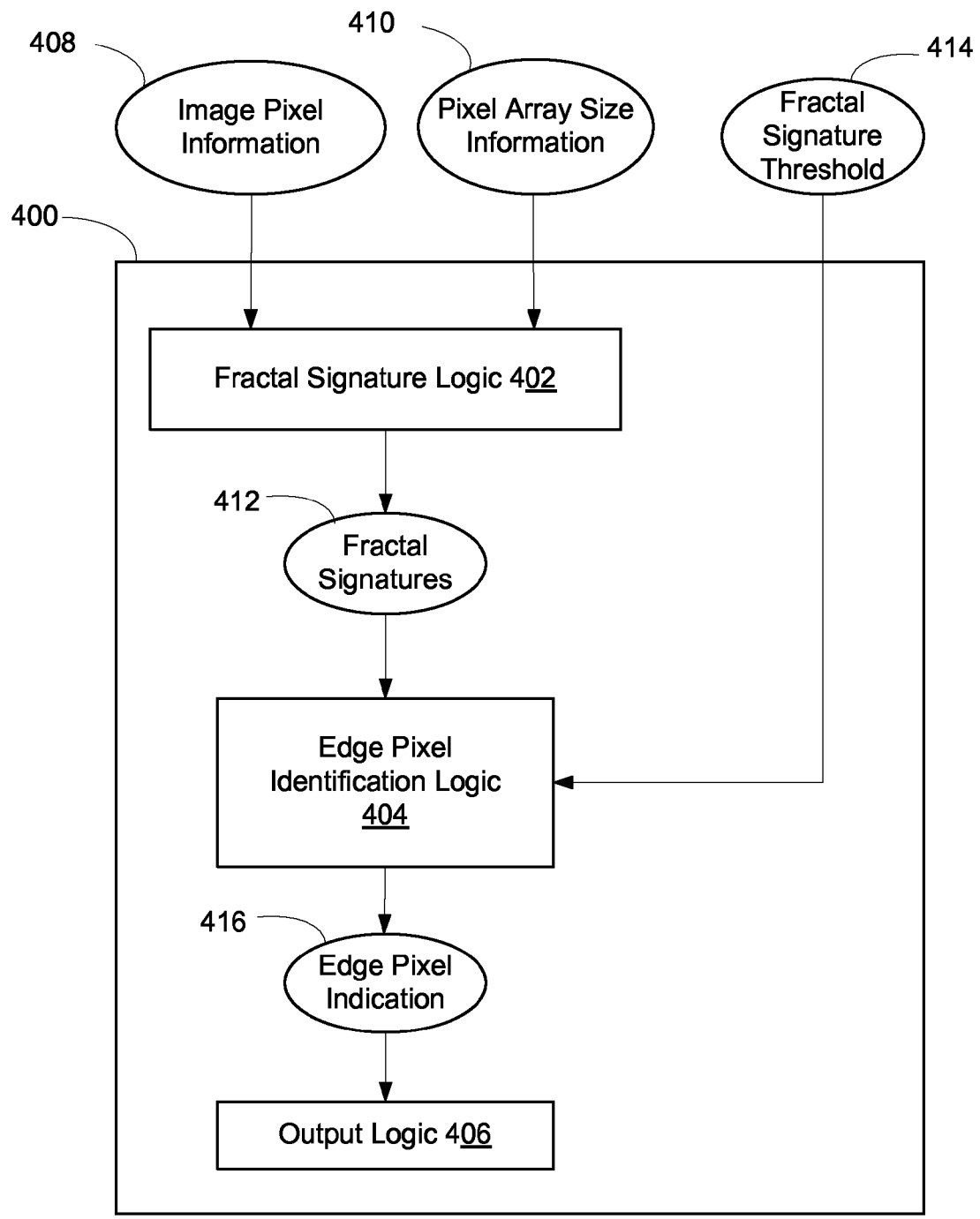
FIG. 4 is a block diagram of an exemplary system to identify edge pixels in an image.

FIG. 4 is a block diagram of an exemplary system 400 to identify edge pixels in an image.

In FIG. 1, at 102, a fractal signature is determined for an image pixel. The fractal signature may include one or more of a variety of fractal dimensions associated with the pixel, which may be determined from the pixel and from pixels that are proximate to the pixel.

For example, and without limitation, a topographical, or surface fractal dimension may be calculated for an array of pixels that includes the pixel, using x and y coordinates associated with the pixels as geographical x and y coordinates, and corresponding pixel luminosity and/or color values as z-coordinates, or altitude values. Such a topographical fractal dimension is indicative of a homogenous or non-homogenous nature of a portion of the image represented by the array of pixels. A topographical fractal dimension may be calculated for an area or array of pixels, "A," using equation 1.

$$A(\epsilon) = F\epsilon^{(2-D)} \qquad (EQ.\ 1)$$

(See, Benoit B. Mendelbrot, "The Fractal Geometry of Nature," W.H. Freeman and Company, NY, USA, 1983, ISBN 0-7167-1186-9).

Alternatively, or additionally, a fractal signature may be determined as one or more of a Hausdorff dimension, a packing dimension, Rényi dimensions, a box-counting dimension, a correlation dimension, and/or combinations thereof.

The array of pixels may be centered at, or otherwise include the pixel of interest. The array of pixels may be of any size, such as, for example and without limitation, a 3×3 array, a 5×5 array, a 7×7 array, a 9×9 array, and/or other odd or even numbered array, including non-square and non-symmetric arrays.

In the example of FIG. 3, a fractal dimension is determined for a pixel 312, using a 5×5 array of pixels 314 centered at pixel 312. For pixels near a boarder of an image, a fractal signature may be determined using a different size array and/or an array that includes, but is not necessarily centered at the pixel.

In FIG. 4, system 400 includes fractal signature logic 402 to generate fractal signatures 412 from image pixel information 408 and array size information 410. Array size information 410 may be received from a user, memory, or logic.

At 104 in FIG. 1, the fractal signature of the pixel is compared to a fractal signature threshold. As described below with respect to FIGS. 5, 6, and 7, the fractal signature threshold may be determined in a supervised fashion from a plurality of training edge pixels. Alternatively, the fractal signature threshold may be received from a user or a computer system.

When the fractal signature of the pixel is equal to or greater than the fractal signature threshold, the pixel is identified at 106 as an edge pixel. Processing then returns to 102, where the fractal signature of another pixel determined.

Returning to 104, when the fractal signature of the pixel is less than the fractal signature threshold, the pixel is not identified as an edge pixel and processing returns to 102 for processing of another pixel.

In FIG. 4, system 400 includes edge pixel identification logic 404 to compare fractal signatures 412 to a fractal signature threshold 414, and to generate an edge pixel indication 416, corresponding to a pixel, when the fractal signature of the pixel is equal to or greater than fractal signature threshold 414.

In FIG. 1, 104 through 108 may be repeated for all pixels of an image.

In FIG. 1, 104 through 108 may be performed for multiple sub-sets of pixels within an image using a different fractal signature threshold for one or more of the sub-sets of pixels. This may be useful, for example, where an image includes adjacent features that are more homogonous than other adjacent features, where boarders between some of the features may be more clearly defined than boarders between other features. The sub-sets of pixels may be defined under user-supervision and/or according to a computer-implemented method.

Referring back to 102 in FIG. 1, the fractal signature threshold may be determined from fractal signatures of one or more known, or training edge pixels. The one or more training edge pixels may be used to generate a model that generates the fractal signature threshold. The number of training edge pixels may be any number, including, without limitation, between 1 and 10, including 3 and 5.

Figure 5:
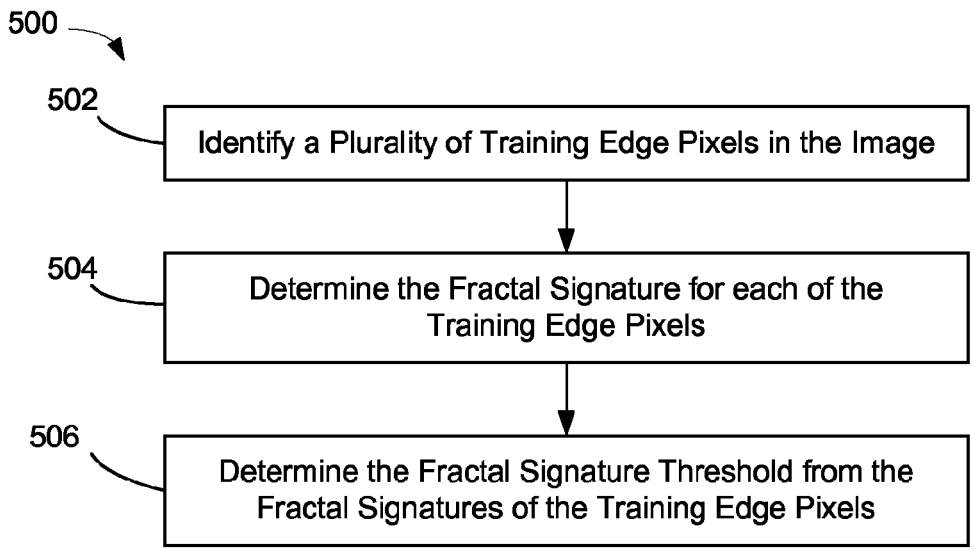
FIG. 5 is a process flowchart illustrating an exemplary method of determining a fractal signature threshold.
Figure 6:
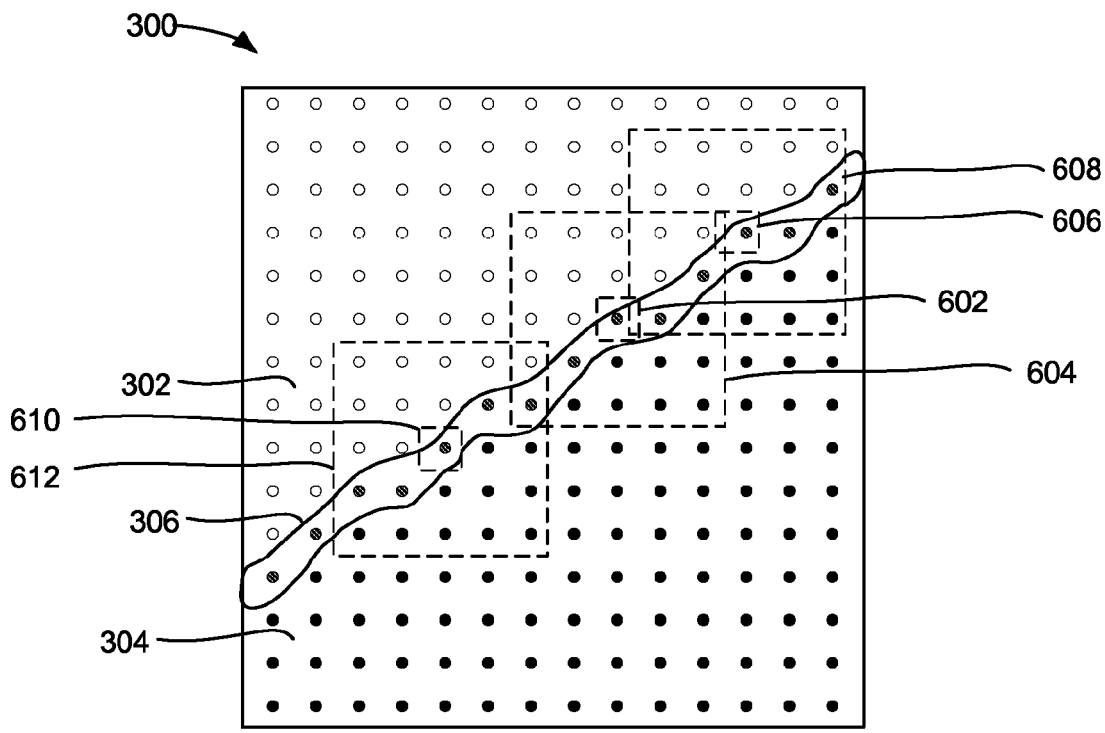
FIG. 6 is another graphical representation of exemplary pixels of image portion 202 of FIG. 2.
Figure 7:
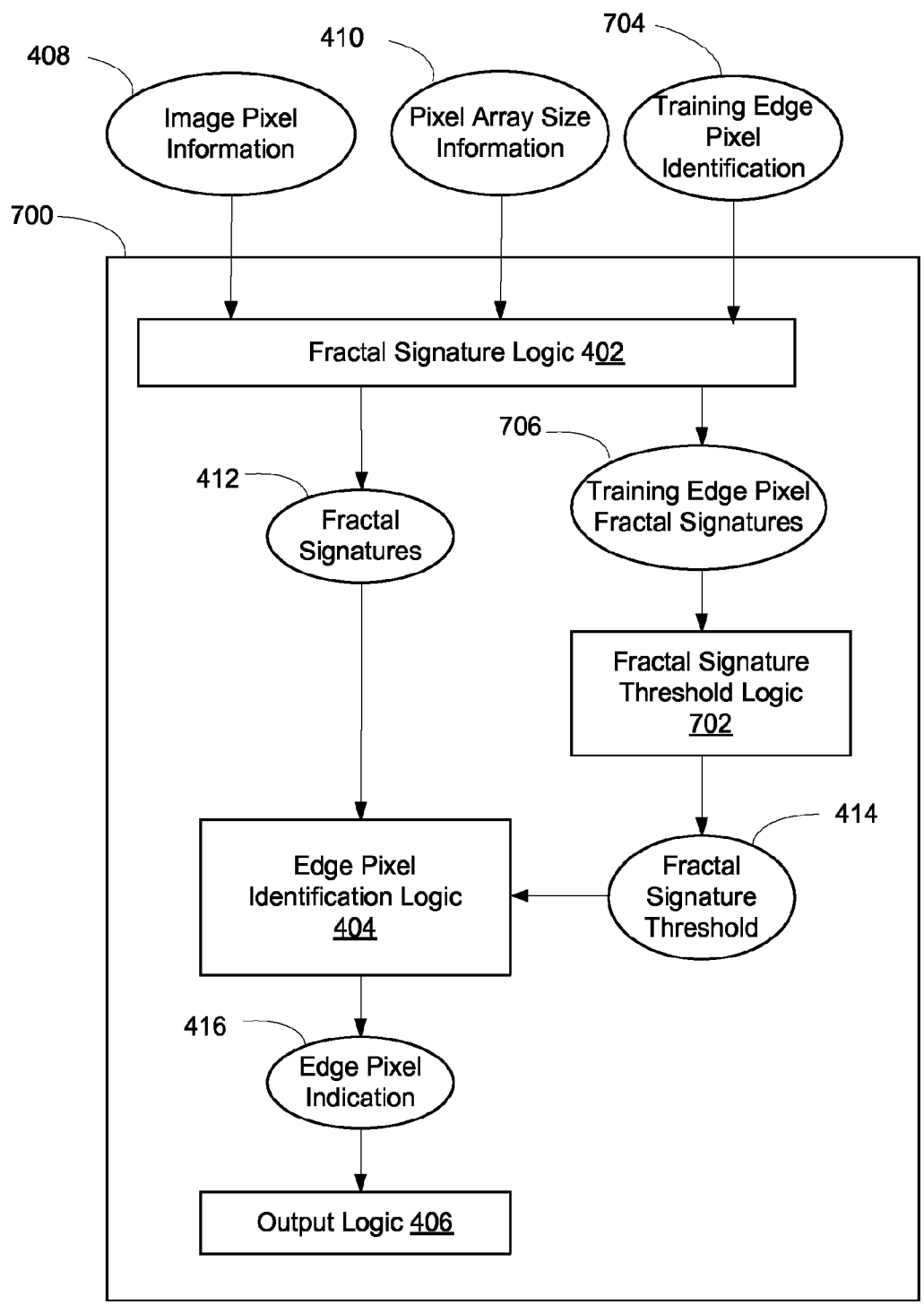
FIG. 7 is a block diagram of an exemplary system to identify edge pixels in an image and to generate a fractal signature threshold.

FIG. 5 is a process flowchart illustrating an exemplary method 500 of determining a fractal signature threshold. Method 500 is described below with reference to FIGS. 6 and 7 for illustrative purposes. FIG. 6 is another graphical representation of exemplary pixels 300 of image portion 202 in FIG. 2. FIG. 7 is a block diagram of an exemplary system 700 to identify edge pixels in an image, as disclosed with respect to FIG. 4, and to generate a fractal signature threshold.

At 502 in FIG. 5, a plurality of training edge pixels is identified within an image. The plurality of training edge pixels may be identified under user-supervision or user-selection. Identification of the training edge pixels under user-supervision may help to insure and/or improve accuracy of edge detection. Alternatively, or additionally, the training edge pixels may be identified using one or more of a variety of conventional edge detection techniques.

Training edge pixels may be identified along a boundary between adjacent image features. For example, in FIG. 6, pixels 602, 606, and 610 may be identified as training edge pixels. Alternatively, training edge pixels may be identified from multiple boundaries between multiple adjacent image features.

At 504, fractal signatures are determined for the training edge pixels. The fractal signatures of the training edge pixels may be determined as described above with respect to FIG. 1. In the example of FIG. 6, fractal dimensions are determined for training edge pixels 602, 606, and 610 from corresponding 5×5 pixel arrays 604, 608, and 612.

In FIG. 7, system 700 includes fractal signature logic 402 to generate training edge pixel fractal signatures 706 from image pixel information 408, array size information 410, and training edge pixel identification 704. Training edge pixel identification 704 may be received from a user, memory, or logic.

At 506, the fractal signature threshold is determined from the fractal signatures of the training edge pixels. The fractal signature threshold may be determined as the arithmetic mean of the fractal signatures of the training edge pixels. For example, in a computer program implementation, the fractal signature threshold may initially be set to a nominal value, such as zero, and thereafter incremented by each of the fractal signatures of the training edge pixels, and thereafter be divided by the number of training edge pixels. In FIG. 7, system 700 includes fractal signature threshold logic 702 to generate fractal signature threshold 414 from training edge pixel fractal signatures 706.

One or more features and/or combinations of features disclosed herein, including logic illustrated in FIGS. 4 and 7, may be implemented in a system including hardware, software, firmware, and/or combinations thereof, including discrete and integrated circuit logic, application specific integrated circuit (ASIC) logic, microcontrollers, and a computer program product including a computer readable medium having computer program logic stored therein to cause a computer system to perform one or more features and/or combinations of features disclosed herein.

Where one or more features and/or combinations of features disclosed herein are implemented in a system, the system may be may be configured to output an indication of the identified edge pixels to one or more of a user, a printer, a display, a memory device, such as a computer memory device, other hardware, software, firmware, and/or a computer system. The indication of the identified edge pixels may be used in one or more subsequent image feature detection and extraction processes, and/or in one or more other image and/or graphics processing processes. For example, in FIGS. 4 and 7, system 400 and/or system 700 may include output logic 406 to output edge pixel identification 416.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A system, comprising:
a fractal signature module to determine a fractal signature of each pixel of a first set of edge pixels of an image, and of a first pixel of the image outside of the first set of edge pixels;
a threshold module to determine a first fractal signature threshold from the fractal signatures of the first set of edge pixels; and
an edge pixel identification module to compare the fractal signature of the first pixel to the first fractal signature threshold, and selectively identify the first pixel as an edge pixel based on the comparison.

2. The system of claim 1, wherein the fractal signature module is configured to determine the first fractal signature threshold as an average of the fractal signatures of the first set of edge pixels.

3. The system of claim 1, wherein the fractal signature module is configured to identify the first set of edge pixels based on user-input.

4. The system of claim 1, wherein the fractal signature module is configured to identify the first set of edge pixels with a machine-implemented technique.

5. The system of claim 1, wherein the fractal signature module is configured to determine the fractal signatures of the first set of edge pixels and of the first pixel with a same fractal signature computational technique.

6. The system of claim 1, wherein the fractal signature module is configured to determine the fractal signature of the first set of edge pixels and of the first pixel based on a configurable-size array of pixels that includes the corresponding pixel.

7. The system of claim 1, wherein:
the fractal signature module is configured to determine a fractal signature of each pixel of a second set of edge pixels of the image;
the threshold module is configured to determine a second fractal signature threshold from the fractal signatures of the second set of edge pixels; and
the edge pixel identification module is configured to selectively compare the fractal signature of the first pixel to one of the first and second fractal signature thresholds based on proximity of the first pixel to the first and second sets of edge pixels.

8. A non-transitory computer readable medium encoded with a computer program, including instructions to cause a processor to:
determine a fractal signature of each pixel of a first set of edge pixels of an image, and of a first pixel of the image outside of the first set of edge pixels;
determine a first fractal signature threshold from the fractal signatures of the first set of edge pixels;
compare the fractal signature of the first pixel to the first fractal signature threshold; and
selectively identify the first pixel as an edge pixel based on the comparison.

9. The computer readable medium of claim 8, further including instructions to cause the processor to determine the first fractal signature threshold as an average of the fractal signatures of the first set of edge pixels.

10. The computer readable medium of claim 8, further including instructions to cause the processor to identify the first set of edge pixels based on user-input.

11. The computer readable medium of claim 8, further including instructions to cause the processor to identify the first set of edge pixels with a machine-implemented technique.

12. The computer readable medium of claim 8, further including instructions to cause the processor to determine the fractal signatures of the first set of edge pixels and of the first pixel with a same fractal signature computational technique.

13. The computer readable medium of claim 8, wherein the fractal signature module is configured to determine the fractal signature of the first set of edge pixels and of the first pixel based on a configurable-size array of pixels that includes the corresponding pixel.

14. The computer readable medium of claim 8, further including instructions to cause the processor to:
determine a fractal signature of each pixel of a second set of edge pixels of the image;
determine a second fractal signature threshold from the fractal signatures of the second set of edge pixels; and
selectively compare the fractal signature of the first pixel to one of the first and second fractal signature thresholds based on proximity of the first pixel to the first and second sets of edge pixels.

15. A machine-implemented method, comprising:
determining a fractal signature of each pixel of a first set of edge pixels of an image, and of a first pixel outside of the first set of edge pixels;
determining a first fractal signature threshold from the fractal signatures of the first set of edge pixels;
comparing the fractal signature of the first pixel to the first fractal signature threshold; and
selectively identifying the first pixel as an edge pixel based on the comparing.

16. The method of claim 15, further including:
determining the first fractal signature threshold as an average of the fractal signatures of the first set of edge pixels.

17. The method of claim 15, further including:
identifying the first set of edge pixels based on user-input.

18. The method of claim 15, further including:
determining the fractal signatures of the first set of edge pixels and of the first pixel with a same fractal signature computational technique.

19. The method of claim 15, further including:
determining the fractal signature of the first set of edge pixels and of the first pixel based on a configurable-size array of pixels that includes the corresponding pixel.

20. The method of claim 15, further including:
determining a fractal signature of each pixel of a second set of edge pixels of the image; and
determining a second fractal signature threshold from the fractal signatures of the second set of edge pixels;
wherein the comparing includes selectively comparing the fractal signature of the first pixel to one of the first and second fractal signature thresholds based on proximity of the first pixel to the first and second sets of edge pixels.

* * * * *